United States Patent
Lu et al.

(10) Patent No.: US 10,256,661 B1
(45) Date of Patent: Apr. 9, 2019

(54) RECONFIGURABLE BIDIRECTIONAL WIRELESS CHARGING TRANSCEIVER

(71) Applicant: University of Macau, Macau (MO)

(72) Inventors: Yan Lu, Macau (MO); Mo Huang, Macau (MO); Seng-Pan U, Macau (MO); Rui Paulo Da Silva Martins, Macau (MO)

(73) Assignee: University of Macau, Macau (MO)

( * ) Notice: Subject to any disclaimer, the term of this patent is extended or adjusted under 35 U.S.C. 154(b) by 0 days.

(21) Appl. No.: 15/843,138

(22) Filed: Dec. 15, 2017

(51) Int. Cl.
| | |
|---|---|
| *H01M 10/46* | (2006.01) |
| *H02J 7/02* | (2016.01) |
| *H02J 7/00* | (2006.01) |
| *H02J 50/12* | (2016.01) |

(52) U.S. Cl.
CPC ............ *H02J 7/025* (2013.01); *H02J 7/0054* (2013.01); *H02J 50/12* (2016.02)

(58) Field of Classification Search
CPC .......... H02J 7/025; H02J 5/005; H02J 7/0042; H02J 7/355; H02J 50/12; H02J 50/40
USPC ................... 320/108, 114, 137, 140; 307/104
See application file for complete search history.

(56) References Cited

U.S. PATENT DOCUMENTS

| | | |
|---|---|---|
| 9,407,333 B2 | 8/2016 | Phillips et al. |
| 9,577,463 B2 | 2/2017 | McCoy et al. |
| 2012/0256494 A1* | 10/2012 | Kesler ...................... H03H 7/40 307/104 |
| 2013/0134923 A1 | 5/2013 | Smith et al. |
| 2014/0117921 A1 | 5/2014 | Suomela |

OTHER PUBLICATIONS

M. Huang, Y. Lu, S.P. U and R. P. Martins, "A Reconfigurable Bidirectional Wireless Power Transceiver with Maximum Current Charging Mode and 58.6% Battery-to-Battery Efficiency", Proceedings of IEEE International Solid-State Circuits Conference (ISSCC), Feb. 2017, pp. 376-377.
M. Kiani, B. Lee, P. Yeon and M. Ghovanloo, "A Q-Modulation Technique for Efficient Inductive Power Transmission," IEEE Journal of Solid-State Circuits, vol. 50, No. 12, pp. 2839-2848, Dec. 2015.
L. Cheng, W. H. Ki, Y. Lu and T. S. Yim, "Adaptive On/Off Delay-Compensated Active Rectifiers for Wireless Power Transfer Systems," IEEE Journal of Solid-State Circuits, vol. 51, No. 3, pp. 712-723, Mar. 2016.
(Continued)

*Primary Examiner* — Edward Tso
(74) *Attorney, Agent, or Firm* — Spruson & Ferguson (Hong Kong) Limited

(57) ABSTRACT

Bidirectional wireless power transfer (WPT) manages to provide a first aid to a mobile device that is running out of energy in urgent circumstances. To facilitate bidirectional WPT with minimum additional cost, a WPT transceiver reconfigurable for performing WPT and wireless power reception (WPR) is provided. The transceiver is reconfigurable between a differential class-D power amplifier (PA) and a full-wave rectifier. A maximum current charging mode (MCCM) is used to maximize a battery-to-battery (B2B) charging efficiency, by directly charging the loading battery with the rectifier, and by powering the PA with the sourcing battery. No output voltage or current regulation is used. Then the number of cascaded charging stages is reduced from five in the conventional design to three.

7 Claims, 14 Drawing Sheets

(56) References Cited

OTHER PUBLICATIONS

Y. Lu and W.-H. Ki, "A 13.56 MHz CMOS Active Rectifier With Switched-Offset and Compensated Biasing for Biomedical Wireless Power Transfer Systems," IEEE Transactions on Biomedical Circuits and Systems, vol. 8, No. 3, pp. 334-344, Jun. 2014.
J.-H. Choi, S.-K. Yeo, S. Park, J.-S. Lee and G.-H. Cho, "Resonant Regulating Rectifiers (3R) Operating for 6.78 MHz Resonant Wireless Power Transfer (RWPT)," IEEE Journal of Solid-State Circuits, vol. 48, No. 12, pp. 2989-3001, Dec. 2013.
X. Li, C.-Y. Tsui and W.-H. Ki, "A 13.56 MHz Wireless Power Transfer system with Reconfigurable Resonant Regulating Rectifier and Wireless Power Control for Implantable Medical Devices," IEEE Journal of Solid-State Circuits, vol. 50, No. 4, pp. 978-989, Apr. 2015.
L. Cheng, W. H. Ki and C. Y. Tsui, "A 6.78-MHz Single-Stage Wireless Power Receiver Using a 3-Mode Reconfigurable Resonant Regulating Rectifier," IEEE Journal of Solid-State Circuits, vol. 52, No. 5, pp. 1412-1423, May 2017.

\* cited by examiner

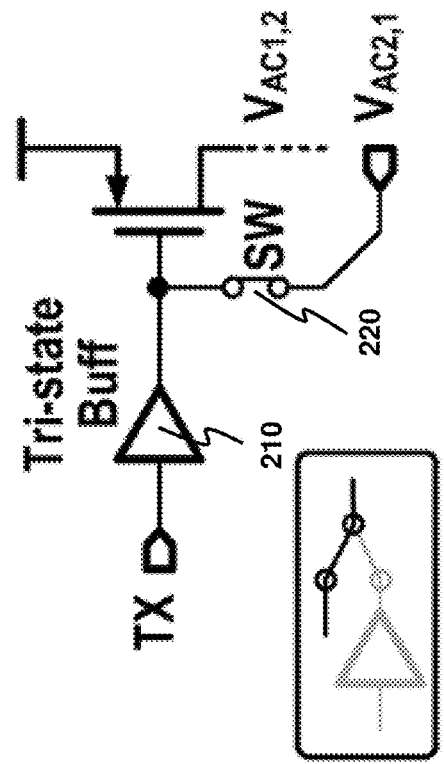
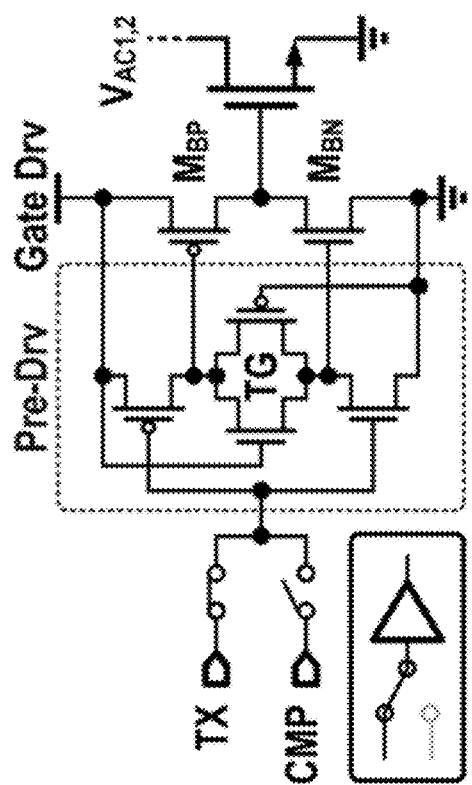
FIG. 7B
FIG. 7A

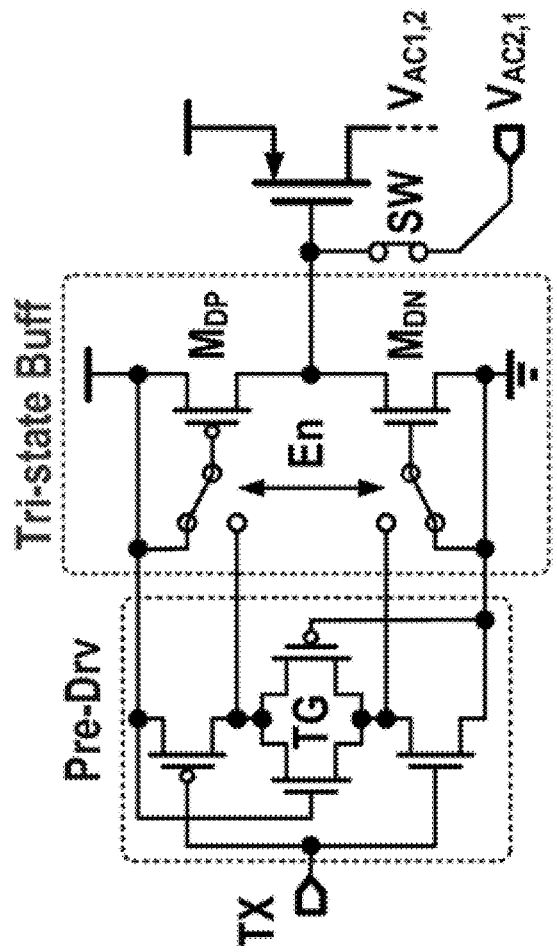
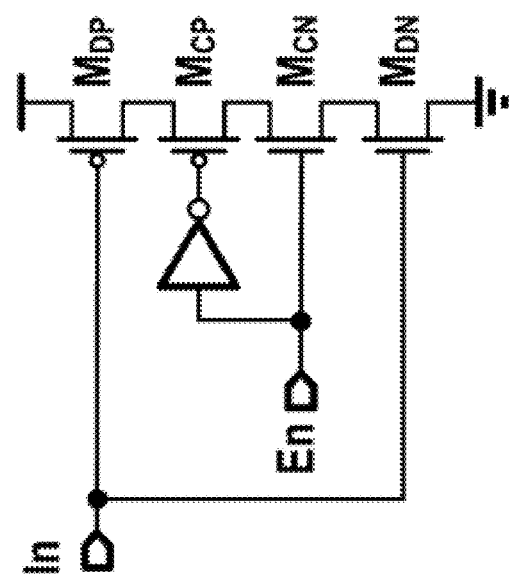
FIG. 7D
FIG. 7C

RECONFIGURABLE BIDIRECTIONAL WIRELESS CHARGING TRANSCEIVER

FIELD OF THE INVENTION

The present disclosure generally relates to a WPT device. In particular, the present disclosure relates to a single WPT device whose configuration enables it to function as a wireless power TX and a wireless power RX.

PRIOR DISCLOSURES BY THE INVENTOR OR A JOINT INVENTOR

Part of the present invention was disclosed in a paper published in 2017 IEEE International Solid-State Circuits Conference (Paper no. 22.4, entitled "A reconfigurable bidirectional wireless power transceiver with maximum-current charging mode and 58.6% battery-to-battery efficiency") on Feb. 5, 2017. This paper is a grace period inventor-originated disclosure disclosed within one year before the effective filing date of this application. This paper is hereby incorporated by reference in its entirety.

BACKGROUND

List of Abbreviations Used Herein 3R resonant regulating rectifier
AC alternating current
B2B battery-to-battery
CCLK complementary clock
CLK clock
CMOS complementary metal-oxide semiconductor
CC constant-current
CV constant-voltage
DC direct current
input-output
MCCM maximum current charging mode
MUX multiplexer
NFC near-field communication
NMOS n-type metal-oxide-semiconductor field-effect transistor
PMOS p-type metal-oxide-semiconductor field-effect transistor
PA power amplifier
PCB printed circuit board
RX receiver
RCC reverse current control
TRX transceiver
TG transmission gate
TX transmitter
WPR wireless power reception
WPT wireless power transfer

LIST OF REFERENCES

The following references are occasionally cited in the specification. Disclosures of these references are incorporated herein by reference in their entirety.

[1] U.S. Pat. No. 9,577,463 B2, Charles McCoy, James R. Milne, True Xiong, "Portable device to portable device wireless power transfer methods and systems", Feb. 21, 2017.
[2] U.S. Pat. No. 9,407,333 B2, Simon Phillips, Alan Johnson, Simon Collins, "Inductive coupling for battery sharing and multi-function inductive antenna", Aug. 2, 2016.
[3] US 20130134923 A1, Michael Gregory Smith; et al., "Apparatus, and associated method, for providing charging energy to recharge a portable power supply", May 30, 2013.
[4] US 20140117921 A1, Riku Suomela, "Method, apparatus, and computer program product for optimized device-to-device charging", May 1, 2014.
[5] M. Huang, Y. Lu, S. P. U and R. P. Martins, "A Reconfigurable Bidirectional Wireless Power Transceiver with Maximum Current Charging Mode and 58.6% Battery-to-Battery Efficiency". *Proceedings of IEEE International Solid-State Circuits Conference (ISSCC)*, February 2017, pp. 376-377.
[6] L. Cheng, W. H. Ki, Y. Lu and T. S. Yim, "Adaptive On/Off Delay-Compensated Active Rectifiers for Wireless Power Transfer Systems," *IEEE Journal of Solid-State Circuits*, vol. 51, no. 3, pp. 712-723, March 2016.
[7] Y. Lu and W.-H. Ki, "A 13.56 MHz CMOS Active Rectifier With Switched-Offset and Compensated Biasing for Biomedical Wireless Power Transfer Systems," *IEEE Transactions on Biomedical Circuits and Systems*, vol. 8, no. 3, pp. 334-344, June 2014.
[8] J.-H. Choi, S.-K. Yeo, S. Park, J.-S. Lee and G.-H. Cho, "Resonant Regulating Rectifiers (3R) Operating for 6.78 MHz Resonant Wireless Power Transfer (RWPT)," *IEEE Journal of Solid-State Circuits*, vol. 48, no. 12, pp. 2989-3001, December 2013.
[9] X. Li, C.-Y. Tsui and W.-H. Ki. "A 13.56 MHz Wireless Power Transfer System with Reconfigurable Resonant Regulating Rectifier and Wireless Power Control for Implantable Medical Devices," *IEEE Journal of Solid-State Circuits*, vol. 50, no. 4, pp. 978-989, April 2015.
[10] L. Cheng, W. H. Ki and C. Y. Tsui, "A 6.78-MHz Single-Stage Wireless Power Receiver Using a 3-Mode Reconfigurable Resonant Regulating Rectifier," *IEEE Journal of Solid-State Circuits*, vol. 52, no. 5, pp. 1412-1423, May 2017.
[11] M. Kiani, B. Lee. P. Yeon and M. Ghovanloo, "A Q-Modulation Technique for Efficient Inductive Power Transmission," *IEEE Journal of Solid-State Circuits*, vol. 50, no. 12, pp. 2839-2848, December 2015.

DESCRIPTION OF RELATED ART

WPT has been employed in a wide range of applications, including mobile, wearable, implantable devices, and wireless sensor networks. In consumer electronics, many new models of portable and wearable devices have already been integrated with the wireless charging function. Meanwhile, the aftermarket wireless charging accessories are also quite mature on the market. With the WPT technology, people may charge their mobile devices without any effort in public places, e.g., coffee shops and restaurants. Also, the WPT technology has a high potential to help the devices to be thinner and waterproof by removing the last connector. It is because power connectors quite often limit the thickness of the devices, and easily wear out in humid environments. Therefore, the number of consumer electronic devices equipped with the wireless charging function is predicted to have an exponential growth.

In WPT, a wireless power TX transfers electrical power to a wireless power RX through magnetic induction. As a nice feature, it opens the opportunity of innovative applications if a consumer-electronics device such as a smartphone can act as a wireless power TX as well as a wireless power RX. By having the device that can act as a TX and a RX in WPT, B2B charging can take place in, but not limited to, the following scenarios: 1) mobile phone to mobile phone charging when the battery of a phone is exhausting; 2) using a mobile phone to charge wearable devices wirelessly; and 3) using a designated portable energy source to charge low-power sensors for industrial applications. FIG. 1 shows a projected future wireless power eco-system which can have four layers. The first layer is a fundamental layer constructed by the wireless charging pad which is connected to the AC mains for fast charging and multiple-device charging. The second layer is an intermediate layer formed by wireless power banks which get energy from a power plant and feed power-hungry mobile devices. The third layer consists of mobile devices that have computation and analysis capabilities, such as notebooks, tablets and mobile phones. The fourth layer consists of low power wearables and wireless sensor nodes, which sense and collect data from a human body or an ambient environment.

A straightforward realization of a consumer-electronics device that can act as a wireless power TX and a wireless power RX is to include both a wireless power TX circuit and a wireless power RX circuit in the device. Alternatively, if a substantial degree of hardware reuse between the TX circuit and the RX circuit can be identified, a bidirectional wireless charging transceiver incorporating both functions of WPT and WPR can be built with a significantly reduced circuit complexity than implementing both the wireless power TX and the wireless power RX together. Potential advantages of this transceiver include a lower bill of materials in manufacturing the aforementioned consumer-electronics device, and a possibility of miniaturizing the size of this device. All of these advantages lead to cost saving.

References [1]-[4] disclose the concept of bidirectional wireless charging between two portable devices. However, these references only disclose a system-level concept in block diagrams. None of [1]-[4] discloses a bidirectional wireless charging transceiver at a circuit level for realizing the above-mentioned advantages. There is a need in the art for the bidirectional wireless charging transceiver having a substantial degree of hardware reuse between wireless power transfer and reception.

SUMMARY OF THE INVENTION

An aspect of the present disclosure is to provide a bidirectional WPT TRX reconfigurable for performing WPT and WPR.

The TRX as disclosed herein has a positive-voltage node and a ground node for connecting to a positive terminal and a negative terminal, respectively, of a rechargeable battery. The ground node has a ground voltage served as a reference voltage. There are also a first power IO node and a second power IO node in the TRX. A clock generator is used for generating a CLK signal and a CCLK signal.

In the TRX, a series resonant tank comprising a capacitor and an inductor connected in series is included. The inductor is used for transferring and receiving wireless power. The series resonant tank has two terminals respectively connected to the first and second power IO nodes.

The TRX further comprises a first PMOS, a second PMOS, a first NMOS and a second NMOS. A source and a drain of the first PMOS are connected to the positive-voltage node and the first power IO node, respectively. A source and a drain of the second PMOS are connected to the positive-voltage node and the second power IO node, respectively. A source and a drain of the first NMOS are connected to the ground node and the first power IO node, respectively. A source and a drain of the second NMOS are connected to the ground node and the second power IO node, respectively.

The TRX further includes a first MUX, a second MUX, a third MUX, a fourth MUX, a first comparator for comparing a first voltage appeared at the first power IO node with the ground voltage, and a second comparator for comparing a second voltage appeared at the second power IO node with the ground voltage. The first to fourth MUXes, each having an output and two inputs, are arranged as follows.

The output of the first MUX couples to a gate of the first PMOS. A first input of the first MUX couples to the CLK signal. A second input of the first MUX couples to the second power IO node.

The output of the second MUX couples to a gate of the second PMOS. A first input of the second MUX couples to the CCLK signal. A second input of the second MUX couples to the first power IO node.

The output of the third MUX couples to a gate of the first NMOS. A first input of the third MUX couples to the CLK signal. A second input of the third MUX couples to an output of the first comparator.

The output of the fourth MUX couples to a gate of the second NMOS. A first input of the fourth MUX couples to the CCLK signal. A second input of the fourth MUX couples to an output of the second comparator.

The TRX is configured to perform WPT by connecting the output of each of the first, second, third and fourth MUXes to the first input thereof. The TRX is configured to perform WPR by connecting the output of each of the first, second, third and fourth MUXes to the second input thereof.

Preferably, the TRX further comprises a first buffer and a second buffer each for buffering the CLK signal. The first buffer is arranged such that the first input of the first MUX couples to the CLK signal through the first buffer. The second buffer is arranged such that the first input of the second MUX couples to the CCLK signal through the second buffer.

It is also preferable that a combination of the first MUX and the first buffer is implemented as a first tri-state buffer and a first switch, and that a combination of the second MUX and the second buffer is implemented as a second tri-state buffer and a second switch.

When the TRX is configured to perform the WPT, the first tri-state buffer buffers the CLK signal and presents the buffered CLK signal to the gate of the first PMOS whereas the first switch is switched off. When the TRX is configured to perform the WPR, the first tri-state buffer is set to have a high impedance so as to disconnect the CLK signal from the gate of the first PMOS whereas the first switch is switched on to connect the gate of the first PMOS and the second power IO node.

When the TRX is configured to perform the WPT, the second tri-state buffer buffers the CCLK signal and presents the buffered CCLK signal to the gate of the second PMOS whereas the second switch is switched off. When the TRX is configured to perform the WPR, the second tri-state buffer is set to have a high impedance so as to disconnect the CCLK signal from the gate of the second PMOS whereas the second switch is switched on to connect the gate of the second PMOS and the first power IO node.

Preferably, the TRX further comprises a third buffer and a fourth buffer. The third buffer is used for buffering the output of the third MUX. The third buffer is arranged such that the output of the third MUX after buffering drives the gate of the first NMOS. The fourth buffer is used for buffering the output of the fourth MUX. The fourth buffer is arranged such that the output of the fourth MUX after buffering drives the gate of the second NMOS.

The first comparator is preferably configured to introduce a first input offset in comparing the first voltage and the ground voltage so as to turn off the first NMOS earlier to compensate for a first delay introduced by the third buffer. The second comparator is also preferably configured to introduce a second input offset in comparing the second voltage and the ground voltage so as to turn off the second NMOS earlier to compensate for a second delay introduced by the fourth buffer.

The first input offset may be maintained by keeping a first RCC signal on. The first comparator may further comprise a first RS latch to keep the first RRC signal on in order to prevent a multiple-pulsing problem of the first NMOS. The second input offset may be maintained by keeping a second RCC signal on. The second comparator may further comprise a second RS latch to keep the second RRC signal on in order to prevent a multiple-pulsing problem of the second NMOS.

Other aspects of the present invention are disclosed as illustrated by the embodiments hereinafter.

BRIEF DESCRIPTION OF THE DRAWINGS

FIG. 7A depicts, in accordance with one embodiment of the present invention, a schematic of the low-side switch and gate driver.

FIG. 7B depicts, in accordance with one embodiment of the present invention, a proposed high-side switch and gate-drive architecture.

FIG. 7C depicts a conventional tri-state inverter buffer.

FIG. 7D depicts, in accordance with one embodiment of the present invention, a proposed tri-state driver.

DETAILED DESCRIPTION

The present disclosure relates to a reconfigurable bidirectional WPT TRX. The TRX as disclosed herein is exemplarily illustrated in Sections A-D, which relate to development of an exemplary TRX and measurement results of the TRX.

A. Observations Leading to Proposed Reconfigurable Bidirectional WPT TRX

The Inventors have found that the wireless power RX can simply reverse its operation direction and become a wireless power TX. By doing so, the area-consuming power transistors and the LC tank can be re-used at almost no cost.

Figure 1:
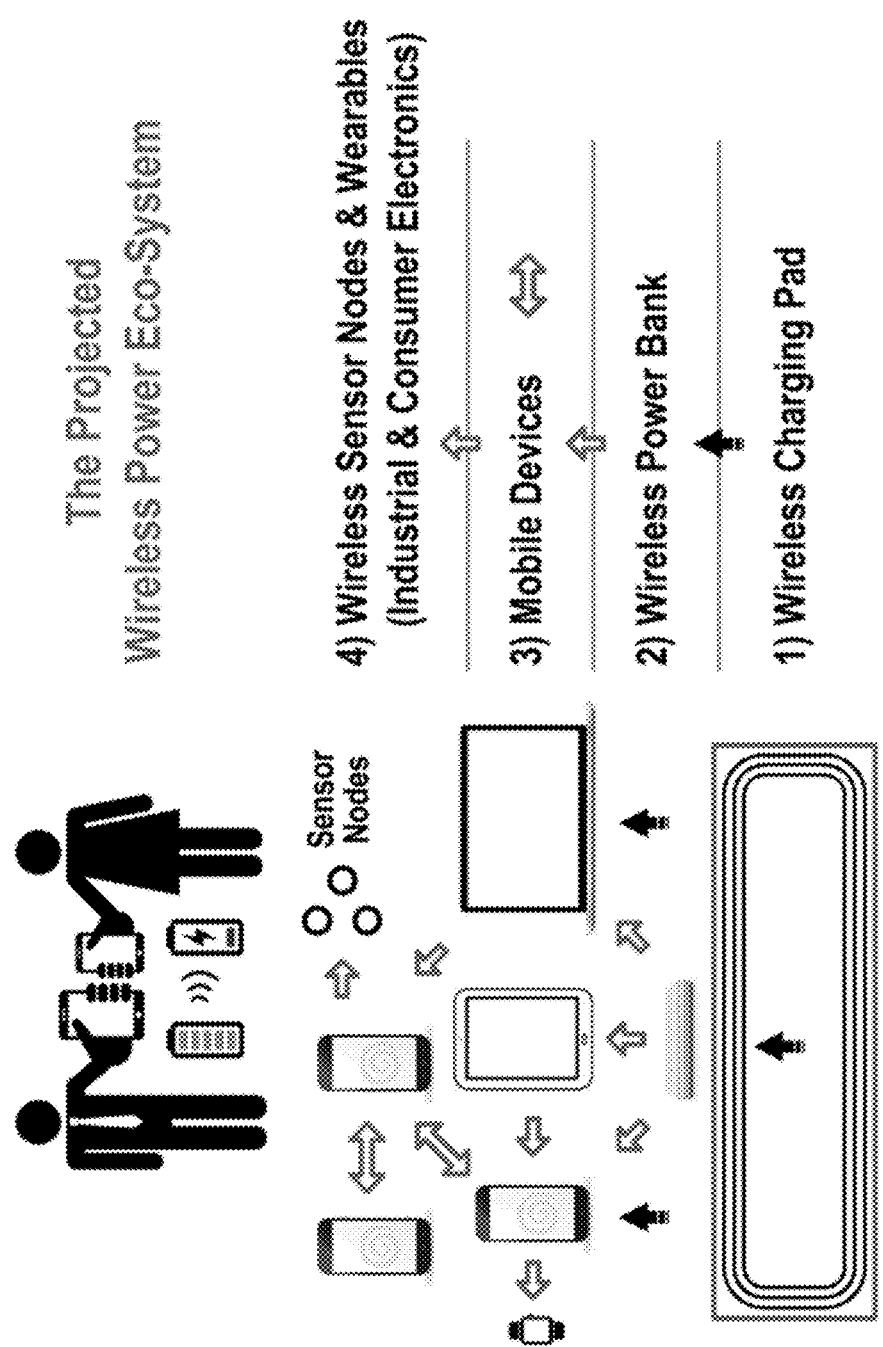
FIG. 1 depicts a projected wireless charging eco-system based on reconfigurable bidirectional wireless charging.
Figure 2A:
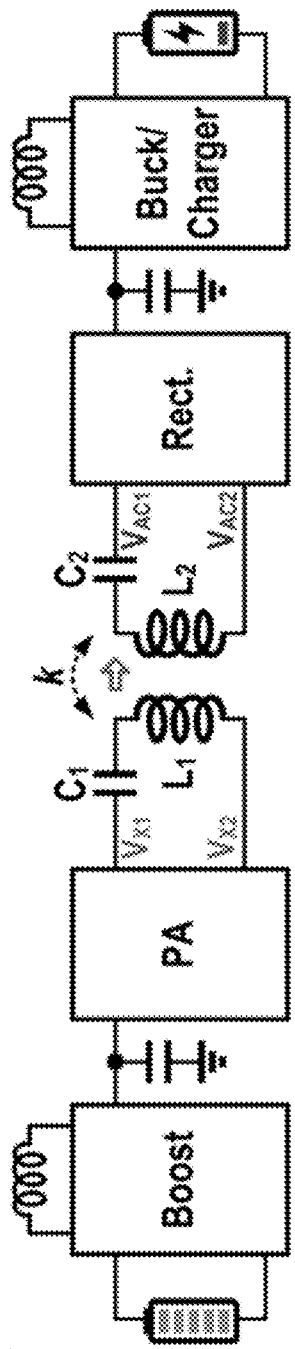
FIG. 2A depicts a conventional bi-directional wireless charging scheme with five cascade stages.

In the conventional pad-to-device wireless charging structure, the wireless power RX consists of a rectifier and usually a buck-type DC-DC converter for CC and CV charging mode control. When we want to turn such wireless power RX into a TX for the B2B charging, the buck converter reverses its operation direction to become a boost converter on the TX side, as shown in FIG. 2A. In this scenario, the total B2B charging efficiency ($\eta_{TOTAL}$) is obtained by multiplying efficiencies of the five cascaded stages as given below:

$$\eta_{TOTAL} = \eta_{BOOST} \times \eta_{PA} \times \eta_{LINK} \times \eta_{RECT} \times \eta_{BUCK}, \quad (1)$$

where $\eta_{BOOST}$, $\eta_{PA}$, $\eta_{LINK}$, $\eta_{RECT}$ and $\eta_{BUCK}$ represent the efficiencies of the boost converter, PA, coupling link, rectifier, and buck-type charger, respectively. Apparently, every cascaded stage degrades the total charging efficiency. Meanwhile, the bulky inductor in the DC-DC converter increases the area and cost of the wireless charging module. More importantly, since the B2B charging is an energy-limited case, one of our targets is to transfer the energy from one battery to another with the minimum loss and a safe charging current.

Figure 2B:
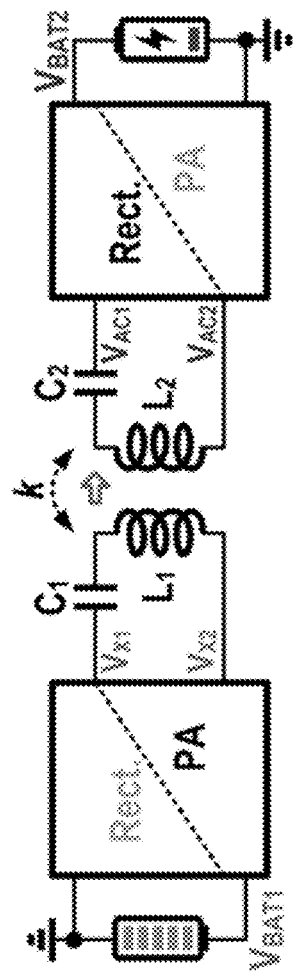
FIG. 2B depicts a MCCM charging scheme with only three stages.

To reduce the number of cascaded stages and consequently to increase the total efficiency of B2B charging, a reconfigurable bidirectional wireless power TRX with the MCCM [5] is proposed in this work, as FIG. 2B shows. Now, the PA is supplied directly by the source battery, and the rectifier charges the loading battery with the maximum available current. Therefore, there are only three essential stages in this system, and the total efficiency is $$\eta_{TOTAL} = \eta_{PA} \times \eta_{LINK} \times \eta_{RECT} \quad (2)$$

By doing so, we significantly reduce the number of off-chip components, achieving a higher total efficiency.

Section B discusses design considerations regarding the reconfigurable WPT TRX topology. Section C analyzes the charging current of the system. The circuit implementations are given in Section D.

B. TRX Topology

B.1 Resonant Tank

For a mobile device, the area of the wireless charging module is quite limited, and there is no room to accommodate separate TX and RX resonant coils. Therefore, the resonant tank in the bidirectional TRX should be reused for both TX and RX modes.

Basically, there are two types of resonant tanks: series and parallel. They have quite different characteristics in terms of impedance transformation, voltage and current waveforms. The series resonant tank transfers a small load impedance on the secondary side into a relatively large equivalent impedance on the primary side [6], thus achieving a higher total efficiency in median/high power scenarios. Meanwhile, the series resonant LC tank behaves like an AC current source, compared to the parallel one that acts like an AC voltage source. This feature makes the secondary input current magnitude nearly independent of its output power [6].

Moreover, the resonant frequency of the series LC tank is, regardless of the load, only related to the values of the inductor and capacitor.

Figure 3:
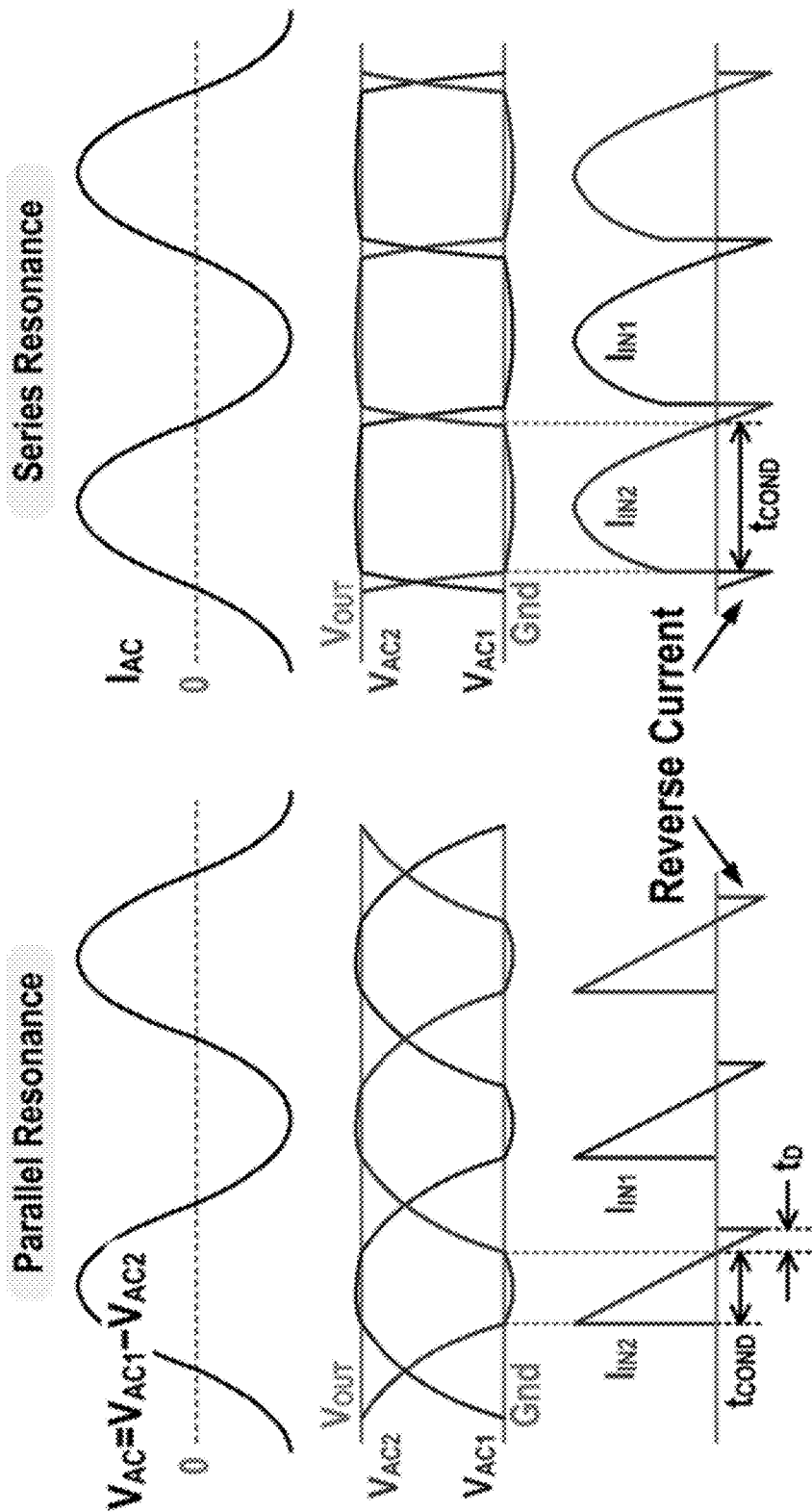
FIG. 3 plots the input current versus reverse current for two cases of using a parallel secondary tank and a series secondary tank in order to compare the reverse current sensitivity experienced between using the parallel tank and using the series tank.

From the circuit design perspective, the series resonant tank is less sensitive to the active diode reverse current as pointed out in [6]. However, we have a different clarification here: as shown in FIG. 3, the parallel resonant tank has sinusoidal-like input voltage waveforms, but with a pulsing input current going into the rectifier. This makes the rectifier output only get current during voltage peaks with a short conduction time ($T_{COND}$). On the other hand, most of the AC current of the resonant tank goes through the rectifier and charges up the output, resulting in a much longer conduction time. As we know, the turned-off delay time ($T_D$) of the comparator in the active diode determines the duration of the reverse current. When an equal $T_D$ is considered for both series- and parallel-resonant cases, $T_D$ would be a small portion of $T_{COND}$ in the series resonant case, indicating a higher efficiency for the series resonant case. Based on the above-mentioned comparison results on the series and parallel resonant tanks, we adopt the series resonant tank in the design disclosed in the present disclosure.

B.2 Reconfigurable PA and Rectifier

To save the cost of the bidirectional charging function, the rectifier should be reconfigured to a PA with negligible area overhead. Basically, there are two possible reconfigurable topologies as discussed next.

Figure 4A:
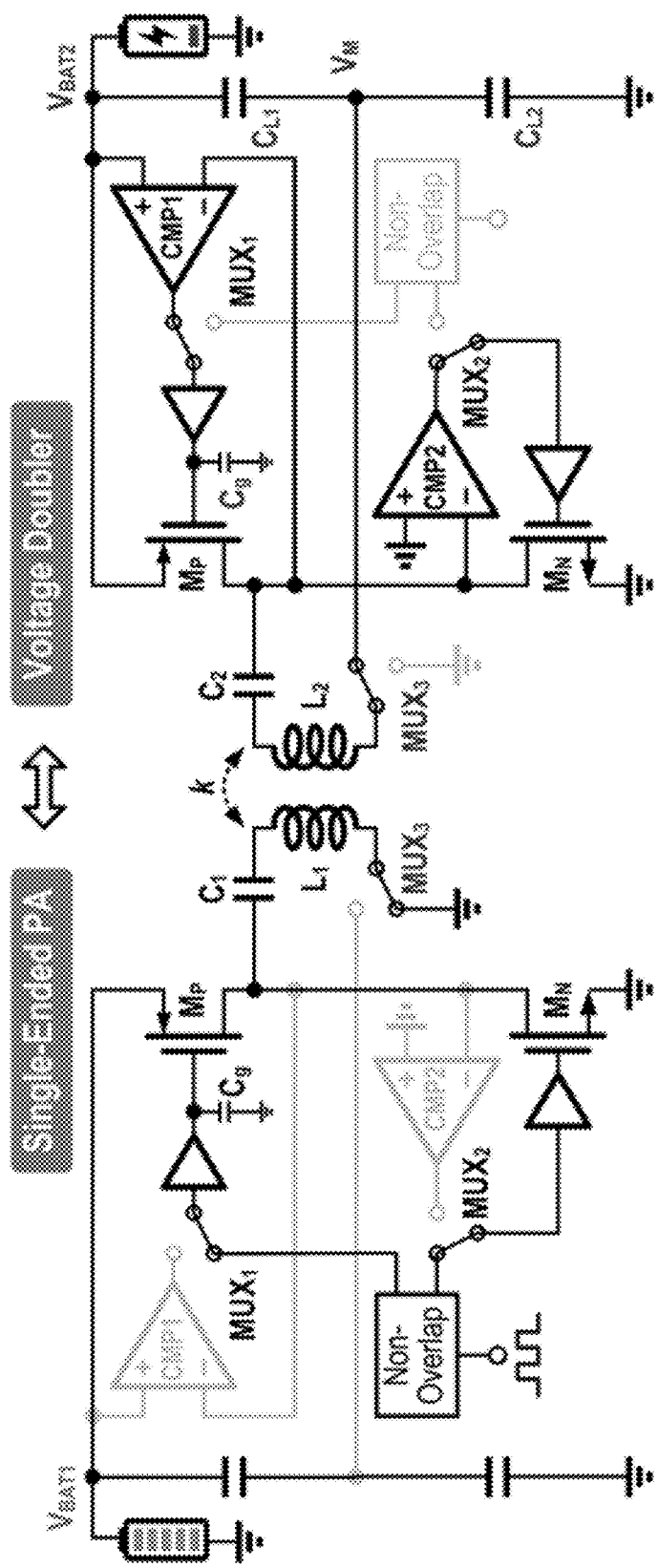
FIG. 4A depicts a first topology of bidirectional TRX that reconfigures itself between a single-ended PA and a voltage doubler.

Topology 1:

FIG. 4A shows a reconfigurable TRX that can be reconfigured between a single-ended PA and an active voltage doubler by reusing the power transistors ($M_P$ and $M_N$) and the resonant tanks ($C_1$, $C_2$, $L_1$ and $L_2$). Three multiplexers ($MUX_1$-$MUX_3$) are employed for the reconfiguration. In the TX mode, $M_N$ and $M_P$ are controlled by the non-overlapping signals through $MUX_1$ and $MUX_2$, and one terminal of the LC tank is connected to ground through $MUX_3$. In the RX mode, the comparators are enabled by $MUX_1$ and $MUX_2$ to operate $M_N$ and $M_P$ as active diodes, and one terminal of the LC tank is shorted to $V_M$. In this way, both the power devices and the resonant tank can be reused. Furthermore, $MUX_1$ and $MUX_2$ are small because they only deal with control signals. On the other hand, $MUX_3$ should be a very large one, because it is on the power path and needs to conduct a large current. In the TX mode, $MUX_3$ needs to be an NMOS which should have the same size as $M_N$, while in the RX mode, $MUX_3$ needs to conduct a large current between the LC tank and $V_M$. Because $V_M$ is a voltage around $\frac{1}{2}V_{BAT2}$, there should be both NMOS and PMOS switches for $MUX_3$, which requires a silicon area larger than $M_P$. Hence, using Topology-1 at least doubles the area for the reconfigurable bidirectional structure.

Besides, this reconfigurable TRX Topology-1 has several drawbacks as discussed as follows. Firstly, $MUX_3$ not only requires a large area as mentioned above, but also generates additional conduction losses when compared to the conventional unidirectional design. Secondly, the single-ended PA only has an output peak-to-peak amplitude that equals to the battery voltage, resulting in a low output power. Thirdly, two additional load capacitors $C_{L1}$ and $C_{L2}$ connected in series are required by the voltage doubler, also increasing the area and cost. Lastly, the gate of the $M_P$ in the voltage doubler needs to be driven by the buffer. On the other hand, for a PMOS cross-connected full-wave rectifier, the PMOS power transistors are driven by the AC inputs and it would significantly reduce the switching loss by recycling the gate-drive energy back to the LC resonant tank [7].

Figure 4B:
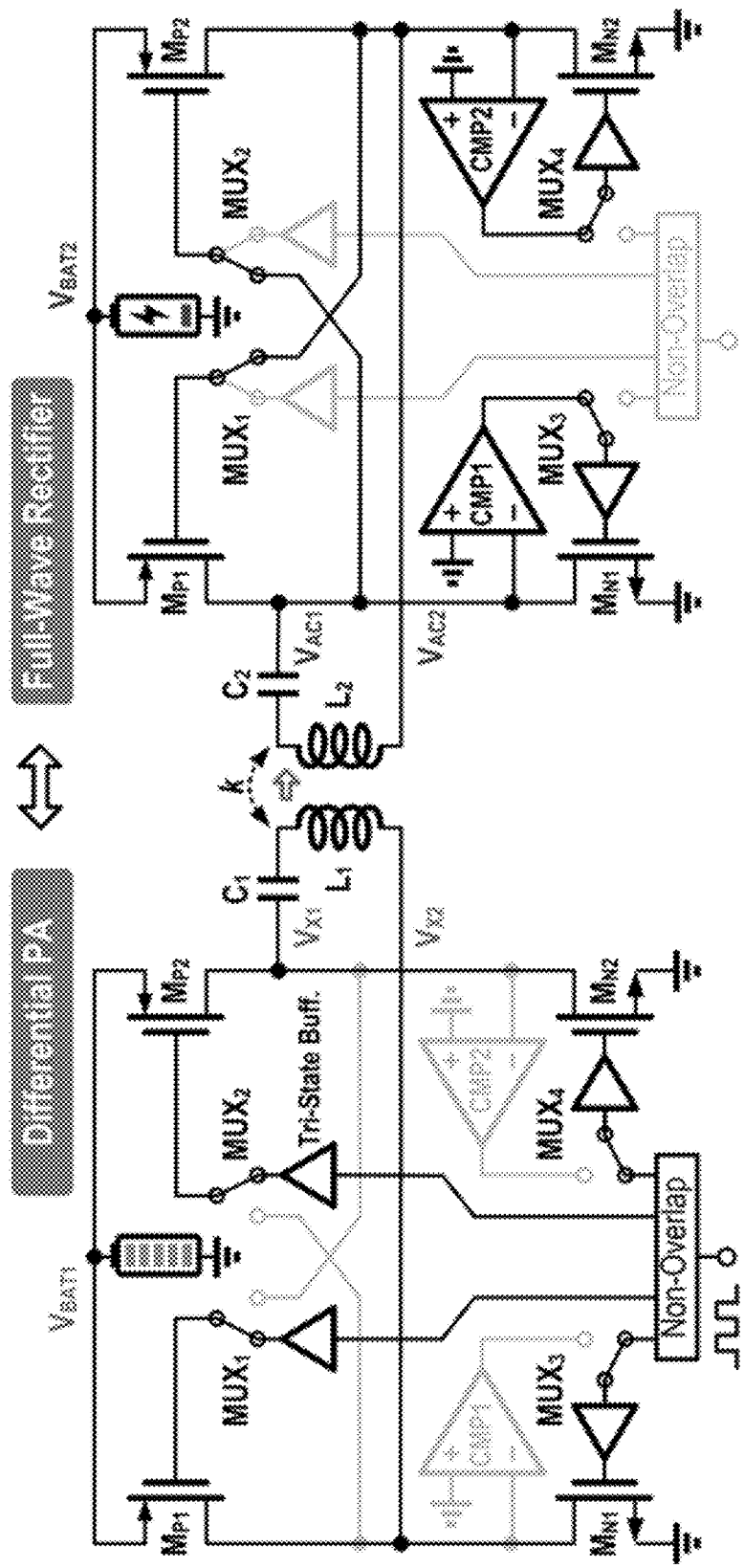
FIG. 4B depicts a second topology of bidirectional TRX that reconfigures itself between a differential PA and a full-wave rectifier.

Topology 2:

The bidirectional TRX can be reconfigured between a differential class-D PA and a full-wave rectifier, as illustrated in FIG. 4B. We need four power devices ($M_{N1}$, $M_{N2}$, $M_{P1}$ and $M_{P2}$) and four multiplexers ($MUX_1$-$MUX_4$) to facilitate the reconfiguration. In the TX mode, we connect all the gates of power devices to the non-overlapping gate drivers through $MUX_1$-$MUX_4$. In the RX mode, $M_{P1}$ and $M_{P2}$ are cross-connected, while $M_{N1}$ and $M_{N2}$ are controlled by outputs of $CMP_1$ and $CMP_2$ as active diodes. Note that all $MUX_1$-$MUX_4$ only deal with gate control signals, and thus can be small-sized with negligible area overhead. In addition, the efficiency offered by Topology-2 is made higher, because both conduction and switching losses are smaller when compared to Topology-1.

C. Maximum Charging Current Mode

The wide adoption of constant-current mode in wired chargers delivers the maximum rated charging current, which is usually the battery-capacity/2-hour for a good battery health. For current fast charging technologies, the charging current is double or even multiple times larger than the rated current. It may affect the battery long-term health.

To reduce the number of cascaded stages for higher overall B2B wireless charging efficiency, we propose the MCCM direct charging scheme. In the present disclosure, we did not implement any output voltage or current regulation, because we found that the maximum output current of the B2B charging system would be lower than the rated maximum charging current allowed by most of the mobile and wearable devices. Therefore, it is natural to directly charge the loading battery with the maximum available current in the B2B case.

Meanwhile, it is possible to regulate the output voltage or current with some existing single-stage regulating rectifier schemes. For example, a 3R using pulse width modulation was proposed in [8] with several additional off-chip components. Reconfigurable 3Rs that configured themselves operating in multiple modes (1×/2× mode in [9] and 0×/½×/1× mode in [10]) were designed without additional off-chip components. Q-modulation with low-frequency operation for low power applications using adaptive switching control was proposed in [11]. For our reconfigurable WPT TRX case, similar output regulation schemes can also be realized for regulating the output voltage and/or current, if necessary.

Figure 5A:
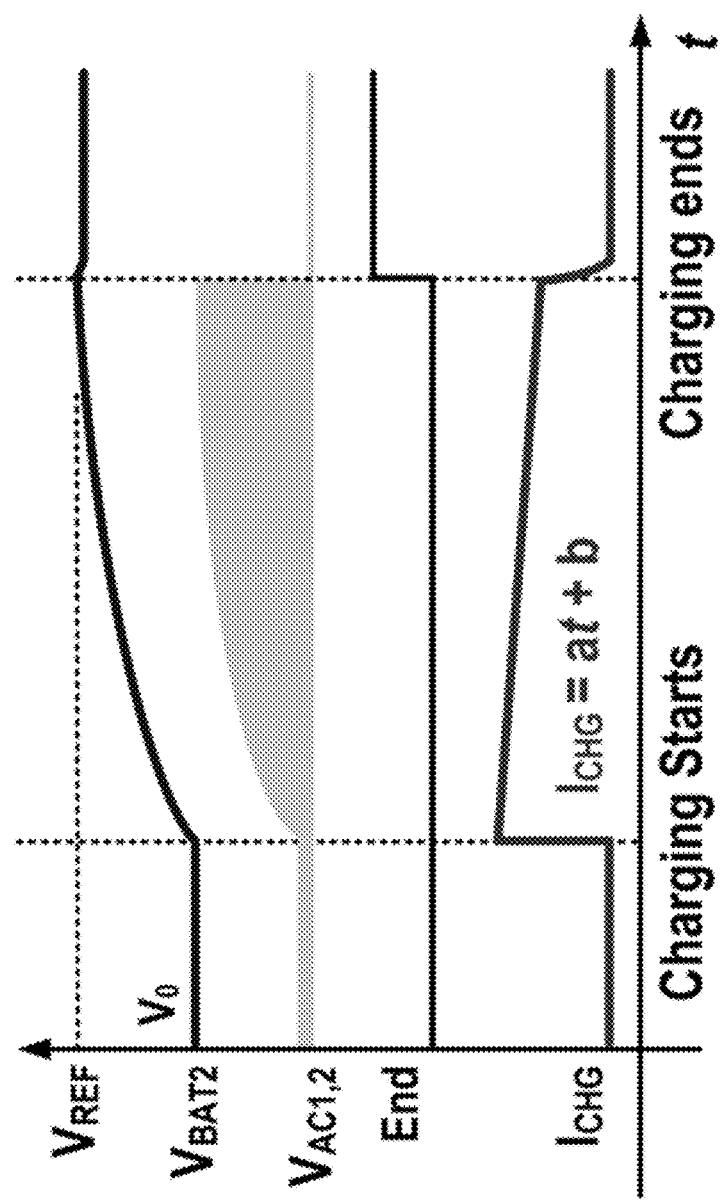
FIG. 5A plots transient waveforms of $V_{BAT2}$, $V_{AC1,2}$ and $I_{CHG}$ with the disclosed charging scheme.
Figure 5B:
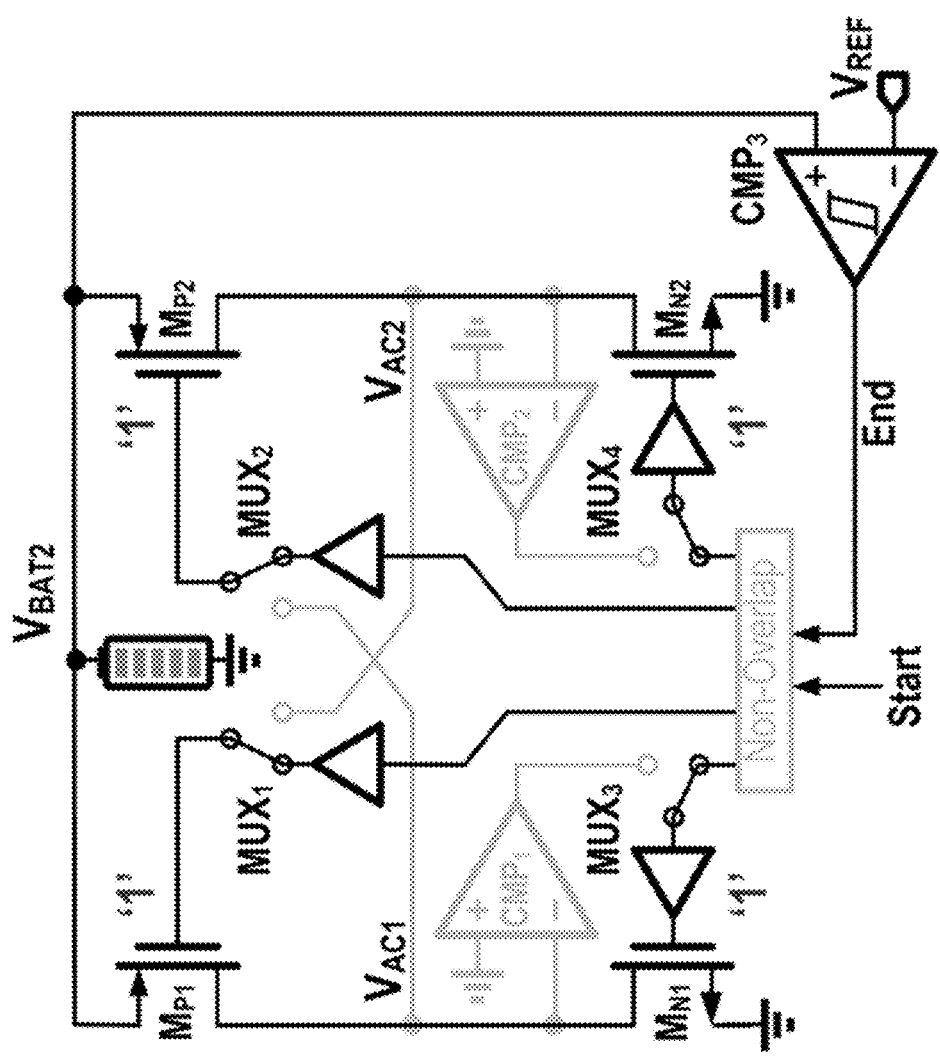
FIG. 5B depicts a simplified schematic of configuring the bidirectional WPT TRX into a bypass mode.

FIG. 5A shows the charging control scheme applied to ensure that the charging voltage $V_{BAT2}$ does not exceed the maximum battery voltage $V_{REF}$ for a safe charging. As observed in our simulation and measurement, $I_{CHG}$ reaches its maximum value b, when the charging process begins. Then, $I_{CHG}$ decreases almost linearly with charging time at a rate of a. When $V_{BAT2}$ exceeds $V_{REF}$, an End signal is generated by a hysteresis comparator to terminate the charging. FIG. 5B shows the schematic of configuring the bidirectional WPT TRX into the bypass mode, which shorts $V_{AC1}$ and $V_{AC2}$ to ground and thus disables the rectifier, causing $I_{CHG}$ to drop to 0. In addition, the TX should be deactivated as well, by possible wireless data communication methods such as backscattering, NFC, or Bluetooth depending on different charging protocols.

Figure 6:
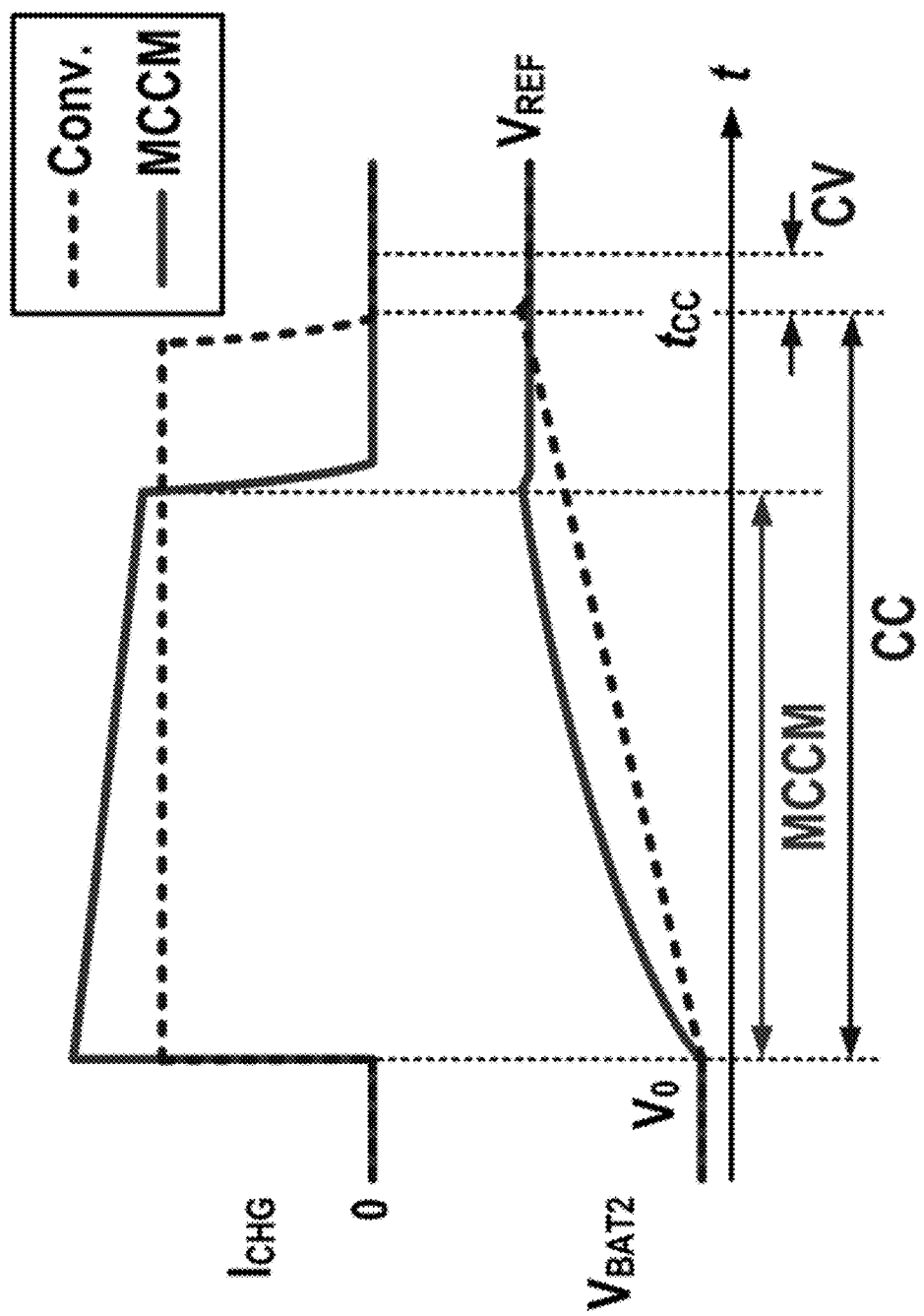
FIG. 6 provides a comparison between the conventional and the MCCM charging schemes.

FIG. 6 shows the comparison between the conventional and MCCM charging schemes. Obviously, the charging speed would be faster with the MCCM. Because the charging current in the CC mode would be set by the current at the end-point $t_{CC}$ of the CC mode, the charging current would be lower than the maximum available current. Also, since $I_{CHG}$ in MCCM decreases with time, $V_{BAT2}$ can be easily monitored. Again, existing single-stage regulating rectifier schemes are compatible with our reconfigurable bidirectional wireless charging, for the output voltage and/or current regulation when necessary.

D. Circuit Implementations

D.1 Multiplexer and Gate Driver

As discussed in Section B, to facilitate the bidirectional B2B wireless charging function, we need multiplexers to reconfigure the TRX into either a TX or a RX. FIGS. 7A-7D show implementations of the MUXs and gate drivers for the low-side NMOS switches and for the high-side PMOS switches. The MUX for the low-side switch is placed before the gate drive buffer (consisting of $M_{BN}$ and $M_{BP}$) for a smaller size of the MUX. A TG is added to the second last buffer stage to reduce the short-circuit current of the last stage buffer by turning-off the $M_{BN}$ first before turning-on the MB, and vice versa.

Figure 8A:
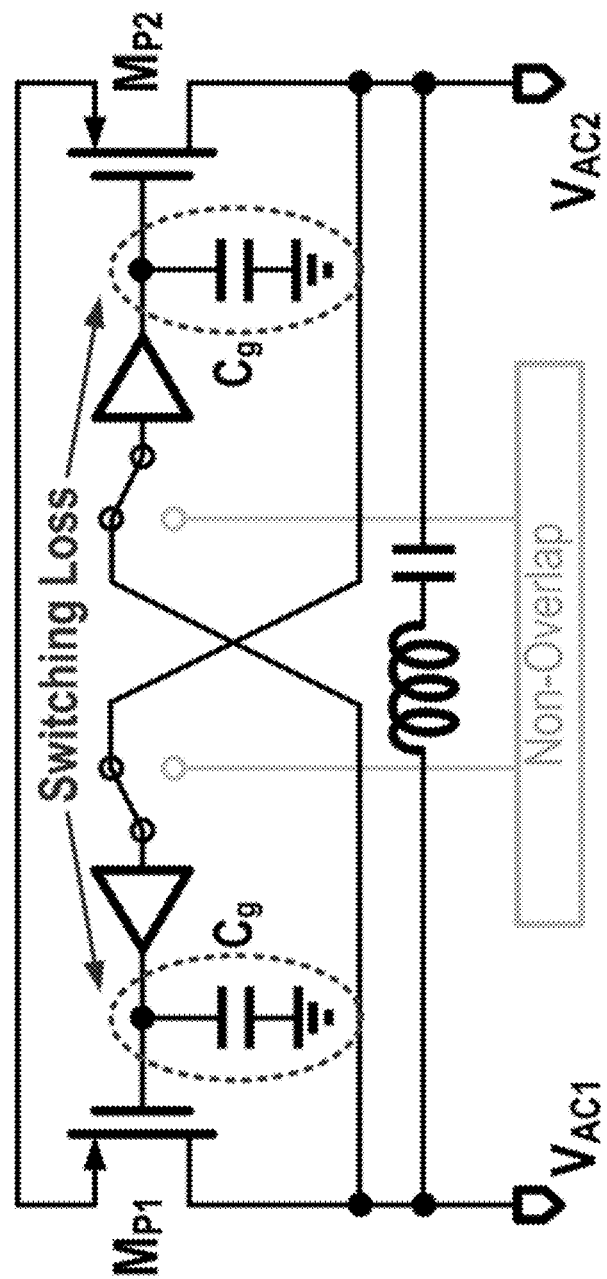
FIG. 8A plots $M_{P1}$ and $M_{P2}$ driven by gate drivers.
Figure 8B:
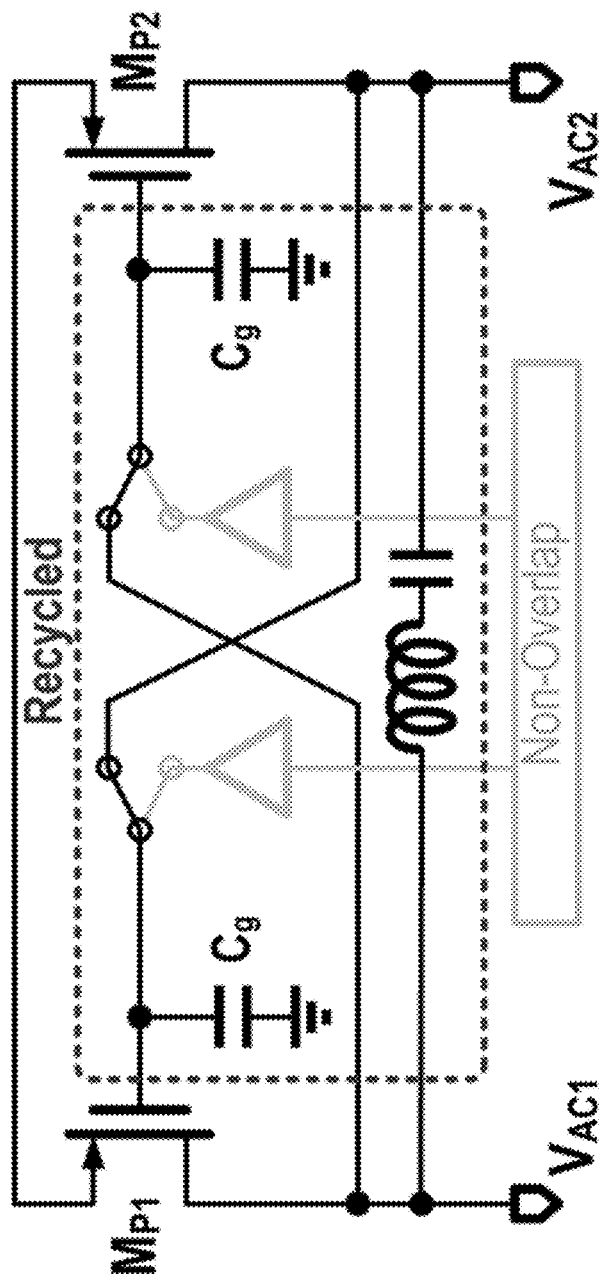
FIG. 8B plots $M_{P1}$ and $M_{P2}$ directly driven by $V_{AC1}$ and $V_{AC2}$, respectively.

On the other hand, if the buffer for the high-side PMOS is also placed after the MUX, significant $C_g V^2$ switching loss will take place, as illustrated by FIGS. 8A and 8B. Therefore, a tri-state buffer is used for the buffer of the high-side switch as shown in FIG. 7B. In the TX mode, the tri-state buffer is enabled for driving the power PMOS. In the RX mode, the tri-state buffer exhibits a high output impedance, and the power PMOS is driven by the AC input. Then, $C_g$ is merged to the LC resonant tank, recycling the gate drive energy as FIG. 8B shows. With this self-driving configuration, the transistor-level simulation shows a roughly 2% improvement on the RX efficiency.

FIG. 7C shows a conventional tri-state inverter, which uses control transistors $M_{CP}$ and $M_{CN}$ to provide a high output impedance. All four transistors in the conventional tri-state inverter should be double sized for the same driving capability when compared to the basic inverter. FIG. 7D shows the tri-state buffer used in the present disclosure. $M_{CP}$ and $M_{CN}$ are removed, and two MUXs are inserted to control $M_{DP}$ and $M_{DN}$. In the RX mode, a high output impedance is required, the gates of $M_{DP}$ and $M_{DN}$ are connected to $V_{DD}$ and ground through the MUXs, respectively. In the TX mode, $M_{DP}$ and $M_{DN}$ are connected to the pre-driver that still prevents the short-circuit current.

D.2 Active Diode

Figure 9:
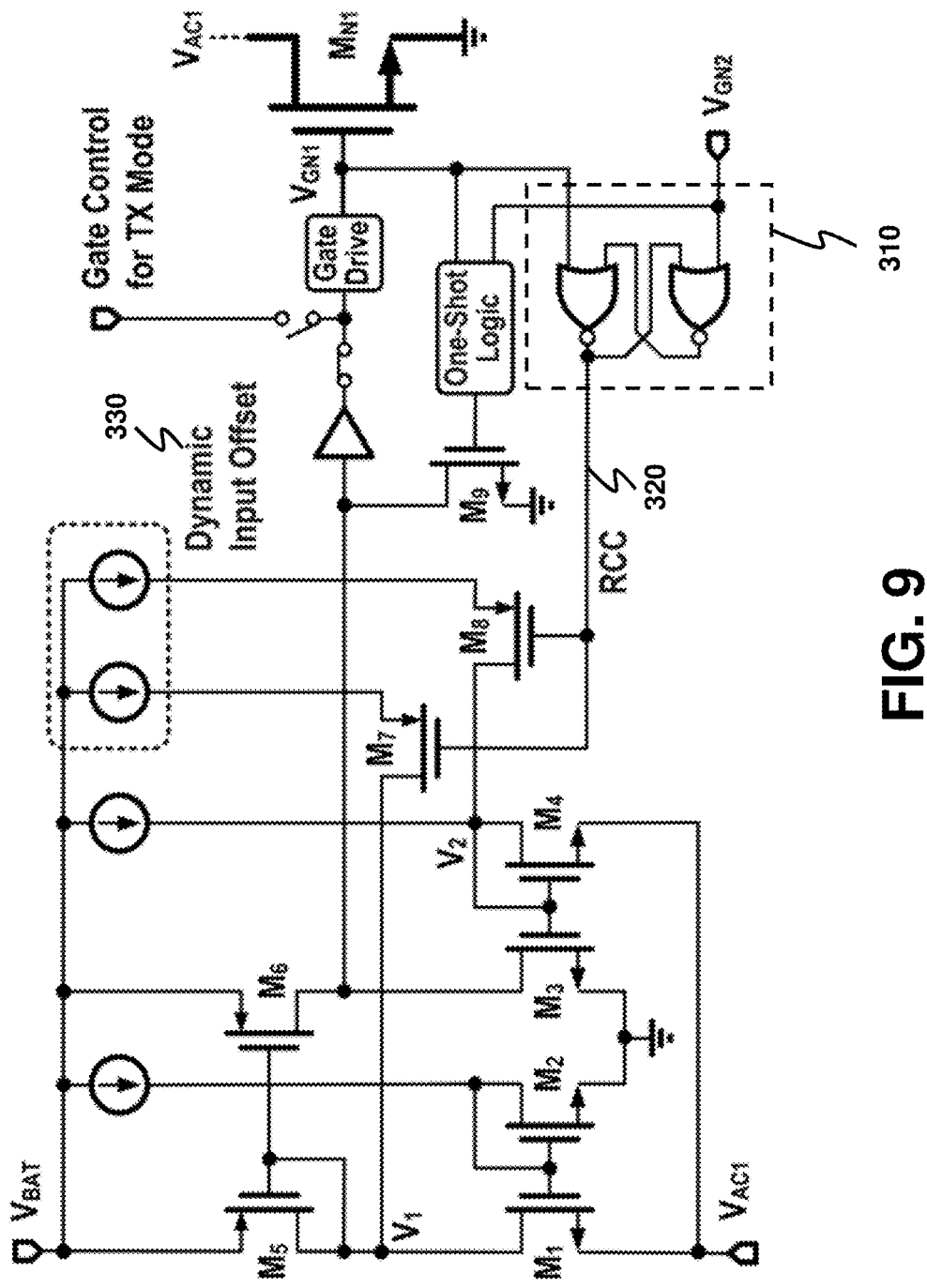
FIG. 9 plots a schematic of the active diode in accordance with one embodiment of the present invention.

FIG. 9 shows the schematic of the NMOS active diode, which is based on the common-gate input push-pull comparator that compares $V_{AC1}$ and ground voltage to turn on or off the power transistor $M_{N1}$. $M_1$-$M_4$ are the common-gate input pairs. To reduce the reverse current caused by the comparator and buffer delay, a RCC scheme is implemented with $M_7$-$M_8$, by adding additional bias currents to generate an input offset [7]. Then, $M_{N1}$ is turned off earlier to compensate for the delay. To prevent the power NMOS from being turned-on more than once per cycle, a.k.a. multiple-pulsing problem, the R-S latch keeps the RCC control signal staying low even when $V_{GN1}$ goes up, so that the comparator input offset exists until $V_{GN2}$ goes up. Furthermore, a one-shot logic detecting the falling-edge of $V_{GN1}$ is employed to pull down the comparator output by Mg, and the logic is reset when $V_{GN2}$ goes up [6]. Therefore, a hard-off for the comparator can be guaranteed. A MUX is added before the gate driver to configure it into the RX or TX mode, corresponding to FIG. 7A.

E. The Present Invention

As used herein, a first node in an electrical circuit "coupling" to a second node in the circuit means that a signal path is set up between the first node and the second node such that an analog or digital signal appeared at the first node is transmissible to the second node no matter whether or not the signal is amplified, attenuated, or distorted during transmission on the signal path, and no matter whether or not the signal is digitally regenerated in case the signal is a digital signal. The signal path may include a buffer for digitally regenerating the digital signal.

An aspect of the present disclosure is to provide a bidirectional WPT TRX reconfigurable for performing WPT and WPR. The results obtained in Sections A-D are generalized for illustrating the disclosed TRX.

Figure 10:
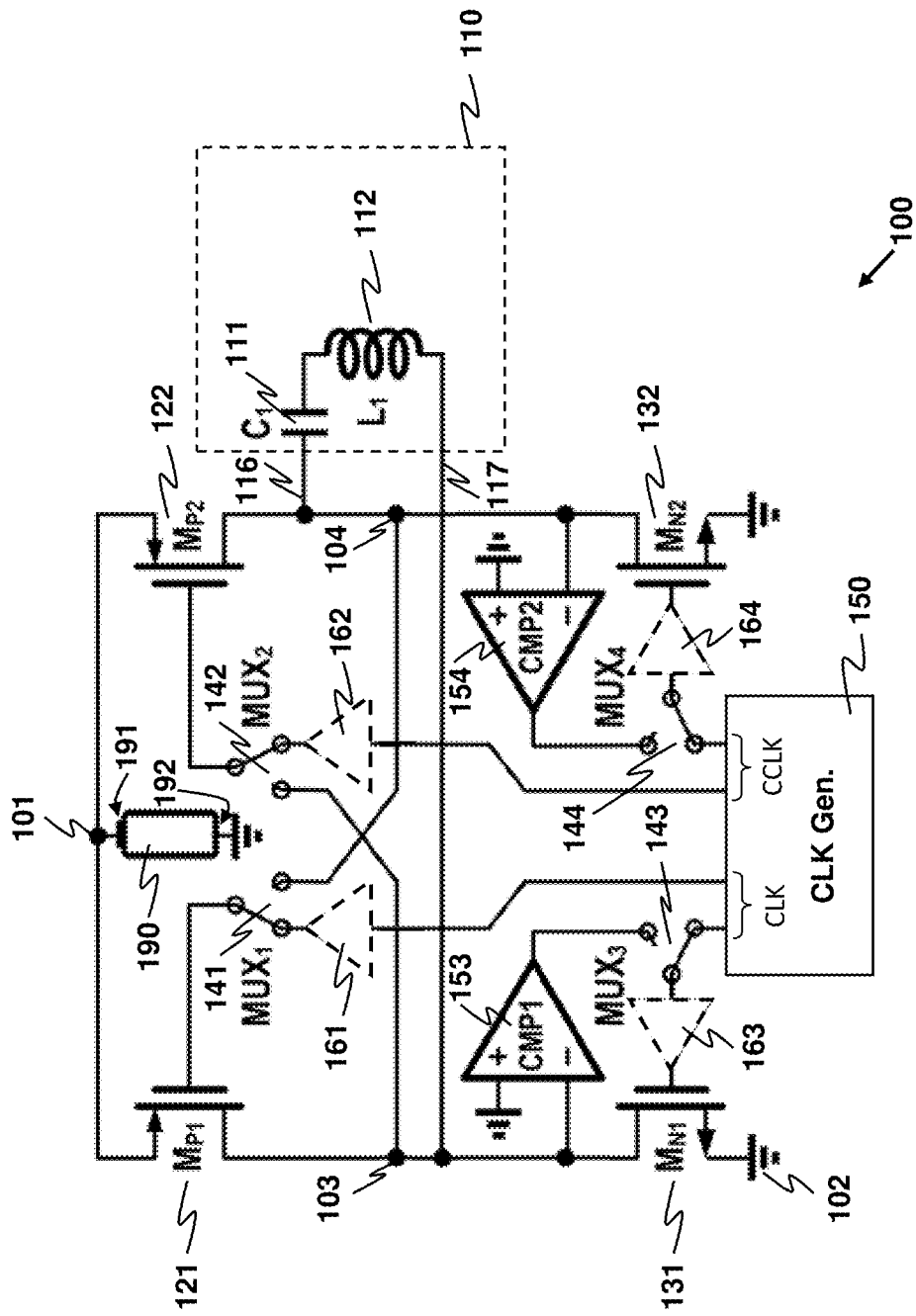
FIG. 10 depicts a reconfigurable bidirectional WPT TRX in accordance with an exemplary embodiment of the present invention.

Exemplarily, a reconfigurable bidirectional WPT TRX 100 is depicted in FIG. 10. The TRX 100 is based on Topology-2 as illustrated in Section B.2.

The TRX 100 comprises a positive-voltage node 101 and a ground node 102 for connecting to a positive terminal 191 and a negative terminal 192, respectively, of a rechargeable battery 190. The ground node 102 has a ground voltage, which serves as a reference voltage for the TRX 100. The TRX 100 further comprises a first power IO node 103 and a second power IO node 104. The TRX 100 further comprises a clock generator 150 for generating a CLK signal and a CLK signal. The CLK and CCLK signals are mutually non-overlapping so that the CLK and CCLK signals form a complementary pair of signals. The CCLK signal is obtained by negating the CLK signal.

In Section B.1, advantages of using a series resonant tank over using a parallel one are elucidated. In the TRX 100, a series resonant tank 110 is formed by including a capacitor 111 and an inductor 112 connected in series, where the inductor 112 is used for transferring and receiving wireless power. The series resonant tank 110 has two terminals 116, 117. The two terminals 116, 117 are respectively connected to the first and second power IO nodes 103, 104.

The TRX 100 further comprises a first PMOS 121, a second PMOS 122, a first NMOS 131 and a second NMOS 132. A source and a drain of the first PMOS 121 are connected to the positive-voltage node 101 and the first power IO node 103, respectively. A source and a drain of the second PMOS 122 are connected to the positive-voltage node 101 and the second power IO node 104, respectively. A source and a drain of the first NMOS 131 are connected to the ground node 102 and the first power IO node 103, respectively. A source and a drain of the second NMOS 132 are connected to the ground node 102 and the second power IO node 104, respectively.

The TRX 100 further comprises a first comparator 153 and a second comparator 154. The first comparator 153 is used for comparing a first voltage appeared at the first power IO node 103 with the ground voltage. The second comparator 154 is used for comparing a second voltage appeared at the second power IO node 104 with the ground voltage.

In addition, the TRX 100 further comprises a first MUX 141, a second MUX 142, a third MUX 143 and a fourth MUX 144. Each of the first to fourth MUXes 141-144 has an output and two inputs.

The output of the first MUX 141 couples to a gate of the first PMOS 121. A first input of the first MUX 141 couples to the CLK signal. A second input of the first MUX 141 couples to the second power IO node 104.

The output of the second MUX 142 couples to a gate of the second PMOS 122. A first input of the second MUX 142 couples to the CCLK signal. A second input of the second MUX 142 couples to the first power IO node 103.

The output of the third MUX 143 couples to a gate of the first NMOS 131. A first input of the third MUX 143 couples to the CLK signal. A second input of the third MUX 143 couples to an output of the first comparator 153.

The output of the fourth MUX 144 couples to a gate of the second NMOS 132. A first input of the fourth MUX 144 couples to the CCLK signal. A second input of the fourth MUX 144 couples to an output of the second comparator 154.

Reconfiguring the TRX 100 for WPT or WPR is achieved by the following procedure. The TRX 100 is configured to perform WPT by connecting the output of each of the first, second, third and fourth MUXes 141-144 to the first input thereof. The TRX 100 is configured to perform WPR by connecting the output of each of the first, second, third and fourth MUXes 141-144 to the second input thereof.

Note that when the TRX 100 is configured to perform WPR, the first and second comparators 153, 154 form two active diodes as explained in Section B.2.

In some practical situations, the CLK and CCLK signals have peak voltage levels or current-driving powers sufficiently large to turn on or turn off the first PMOS 121, the second PMOS 122, the first NMOS 131 and the second NMOS 132 with a certain acceptably-high speed. These signals can be used directly do drive the four transistors 121, 122, 131, 132. Nevertheless, the CLK and CCLK signals are usually generated to be digital signals. There is often a need to include buffers in the TRX 100 to adjust the peak voltage levels of these signals or increase the current-driving powers before driving the four transistors 121, 122, 131, 132.

As discussed in Section D.1, the presence of a buffer can induce substantial switching loss if a MUX is placed after the buffer and then connected to a PMOS. In view of this, preferably the TRX 100 further includes a first buffer 161 and a second buffer 162 each for buffering the CLK signal. The first buffer 161 is arranged such that the first input of the first MUX 141 couples to the CLK signal through the first buffer 161. The second buffer 162 is arranged such that the first input of the second MUX 142 couples to the CCLK signal through the second buffer 162.

Section D.1 also indicates the advantage of using a tri-state buffer in reducing the switching loss. To utilize this advantage, one may implement a combination of the first MUX 141 and the first buffer 161 as a first tri-state buffer 210 and a first switch 220 according to FIG. 7B. When the TRX 100 is configured to perform the WPT, the first tri-state buffer 210 buffers the CLK signal and presents the buffered CLK signal to the gate of the first PMOS 121 whereas the first switch 220 is switched off. When the TRX 100 is configured to perform the WRT, the first tri-state buffer 210 is set to have a high impedance so as to disconnect the CLK signal from the gate of the first PMOS 121 whereas the first switch 220 is switched on to connect the gate of the first PMOS 121 and the second power IO node 104. Similarly, one may also implement a combination of the second MUX 142 and the second buffer 162 as a second tri-state buffer (similar to the first tri-state buffer 210) and a second switch (similar to the first switch 220). When the TRX 100 is configured to perform the WPT, the second tri-state buffer buffers the CCLK signal and presents the buffered CCLK signal to the gate of the second PMOS 122 whereas the second switch is switched off. When the TRX 100 is configured to perform the WRT, the second tri-state buffer is set to have a high impedance so as to disconnect the CCLK signal from the gate of the second PMOS 122 whereas the second switch is switched on to connect the gate of the second PMOS 122 and the first power IO node 103.

Additionally, Section D. 1 elaborates the advantage of adding a buffer between a MUX and an NMOS. As such, it is preferable that the TRX 100 further includes a third buffer 163 and a fourth buffer 164. The third buffer 163 is used for buffering the output of the third MUX 143, and is arranged such that the output of the third MUX 143 after buffering drives the gate of the first NMOS 131. The fourth buffer 164 is used for buffering the output of the fourth MUX 144, and is arranged such that the output of the fourth MUX 144 after buffering drives the gate of the second NMOS 132.

Refer to FIG. 9. As a finding of Section D.2, preferably the first comparator 153 is configured to introduce a first input offset 330 in comparing the first voltage and the ground voltage so as to turn off the first NMOS 131 earlier to compensate for a first delay introduced by the third buffer 163. Similarly, it is also preferable that the second comparator 154 is configured to introduce a second input offset (similar to the first input offset 330) in comparing the second voltage and the ground voltage so as to turn off the second NMOS 132 earlier to compensate for a second delay introduced by the fourth buffer 164.

As illustrated in Section D.2, the first input offset 330 may be maintained by keeping a first RCC signal 320 on, and the second input offset may be maintained by keeping a second RCC signal (similar to the first RCC signal 320) on. The first comparator 153 may further comprise a first RS latch 310 to keep the first RRC signal 320 on in order to prevent a multiple-pulsing problem of the first NMOS 131. The second comparator 154 may further comprise a second RS latch (similar to the first RS latch 310) to keep the second RRC signal on in order to prevent a multiple-pulsing problem of the second NMOS 132.

In practical implementations, each of the first PMOS 121, the second PMOS 122, the first NMOS 131 and the second NMOS 132 is usually a power transistor.

Note that the TRX 100 does not include any output voltage or output current regulation such that the MCCM direct charging scheme is utilized by the TRX 100.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A bidirectional wireless power transceiver reconfigurable for performing wireless power transfer (WPT) and wireless power reception (WPR), the transceiver comprising:
    a positive-voltage node and a ground node for connecting to a positive terminal and a negative terminal, respectively, of a rechargeable battery;
    a first power input-output (IO) node and a second power IO node;
    a series resonant tank comprising a capacitor and an inductor connected in series, the inductor being used for transferring and receiving wireless power, wherein the series resonant tank has two terminals respectively connected to the first and second power IO nodes;
    a first p-type metal-oxide-semiconductor field-effect transistor (PMOS), wherein a source and a drain of the first PMOS are connected to the positive-voltage node and the first power IO node, respectively;
    a second PMOS, wherein a source and a drain of the second PMOS are connected to the positive-voltage node and the second power IO node, respectively;
    a first n-type metal-oxide-semiconductor field-effect transistor (NMOS), wherein a source and a drain of the first NMOS are connected to the ground node and the first power IO node, respectively;

a second NMOS, wherein a source and a drain of the second NMOS are connected to the ground node and the second power IO node, respectively;

a clock generator for generating a clock (CLK) signal and a complementary CLK (CCLK) signal;

a first multiplexer (MUX) having an output and two inputs, the output of the first MUX coupling to a gate of the first PMOS, a first input of the first MUX coupling to the CLK signal, a second input of the first MUX coupling to the second power IO node;

a second MUX having an output and two inputs, the output of the second MUX coupling to a gate of the second PMOS, a first input of the second MUX coupling to the CCLK signal, a second input of the second MUX coupling to the first power IO node;

a first comparator for comparing a first voltage appeared at the first power IO node with a ground voltage appeared at the ground node;

a second comparator for comparing a second voltage appeared at the second power IO node with the ground voltage;

a third MUX having an output and two inputs, the output of the third MUX coupling to a gate of the first NMOS, a first input of the third MUX coupling to the CLK signal, a second input of the third MUX coupling to an output of the first comparator; and a fourth MUX having an output and two inputs, the output of the fourth MUX coupling to a gate of the second NMOS, a first input of the fourth MUX coupling to the CCLK signal, a second input of the fourth MUX coupling to an output of the second comparator, wherein:

the transceiver is configured to perform WPT by connecting the output of each of the first, second, third and fourth MUXes to the first input thereof; and the transceiver is configured to perform WPR by connecting the output of each of the first, second, third and fourth MUXes to the second input thereof.

2. The transceiver of claim 1, further comprising:

a first buffer and a second buffer each for buffering the CLK signal, the first buffer being arranged such that the first input of the first MUX couples to the CLK signal through the first buffer, the second buffer being arranged such that the first input of the second MUX couples to the CCLK signal through the second buffer.

3. The transceiver of claim 2, wherein:

a combination of the first MUX and the first buffer is implemented as a first tri-state buffer and a first switch, wherein:

(a) when the transceiver is configured to perform the WPT, the first tri-state buffer buffers the CLK signal and presents the buffered CLK signal to the gate of the first PMOS whereas the first switch is switched off; and (b) when the transceiver is configured to perform the WPR, the first tri-state buffer is set to have a high impedance so as to disconnect the CLK signal from the gate of the first PMOS whereas the first switch is switched on to connect the gate of the first PMOS and the second power IO node;

and a combination of the second MUX and the second buffer is implemented as a second tri-state buffer and a second switch, wherein:

(a) when the transceiver is configured to perform the WPT, the second tri-state buffer buffers the CCLK signal and presents the buffered CCLK signal to the gate of the second PMOS whereas the second switch is switched off; and (b) when the transceiver is configured to perform the WPR, the second tri-state buffer is set to have a high impedance so as to disconnect the CCLK signal from the gate of the second PMOS whereas the second switch is switched on to connect the gate of the second PMOS and the first power IO node.

4. The transceiver of claim 1, further comprising:

a third buffer for buffering the output of the third MUX, wherein the third buffer is arranged such that the output of the third MUX after buffering drives the gate of the first NMOS; and a fourth buffer for buffering the output of the fourth MUX, wherein the fourth buffer is arranged such that the output of the fourth MUX after buffering drives the gate of the second NMOS.

5. The transceiver of claim 4, wherein:

the first comparator is configured to introduce a first input offset in comparing the first voltage and the ground voltage so as to turn off the first NMOS earlier to compensate for a first delay introduced by the third buffer, and the second comparator is configured to introduce a second input offset in comparing the second voltage and the ground voltage so as to turn off the second NMOS earlier to compensate for a second delay introduced by the fourth buffer.

6. The transceiver of claim 5, wherein:

the first input offset is maintained by keeping a first reverse current control (RCC) signal on;

the first comparator further comprises a first RS latch to keep the first RRC signal on in order to prevent a multiple-pulsing problem of the first NMOS;

the second input offset is maintained by keeping a second RCC signal on; and the second comparator further comprises a second RS latch to keep the second RRC signal on in order to prevent a multiple-pulsing problem of the second NMOS.

7. The transceiver of claim 1, wherein each of the first PMOS, the second PMOS, the first NMOS and the second NMOS is a power transistor.

* * * * *